Dec. 23, 1924.
T. E. PRAY
1,520,137
CONTROLLER FOR ELECTRIC VEHICLES
Filed Feb. 21, 1919    2 Sheets-Sheet 1
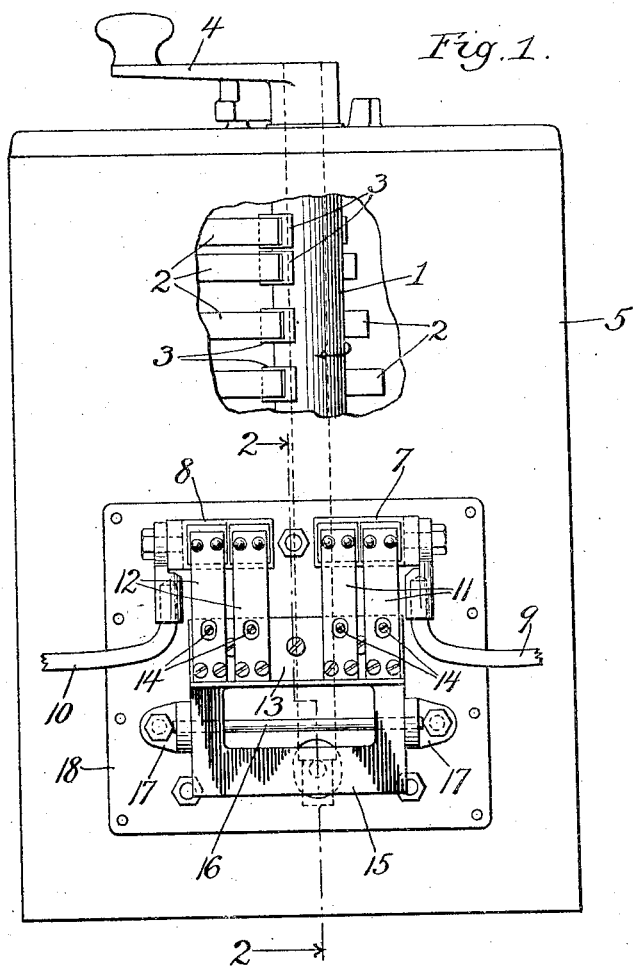
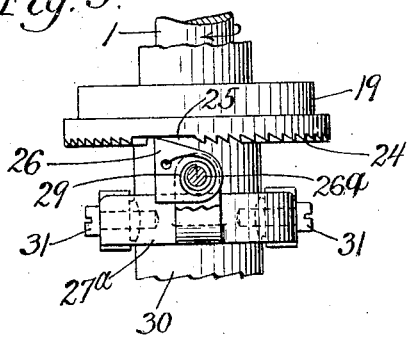
Witness.
Edward T. Wray.
Inventor.
Thomas E. Pray.
by Baker & Carter
Attorneys.

Dec. 23, 1924.
T. E. PRAY
1,520,137
CONTROLLER FOR ELECTRIC VEHICLES
Filed Feb. 21, 1919   2 Sheets-Sheet 2
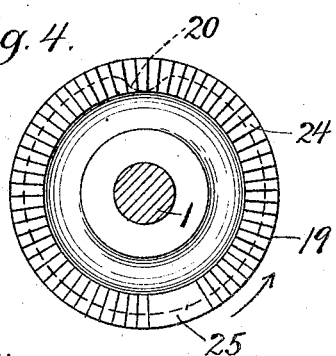
Fig. 4.
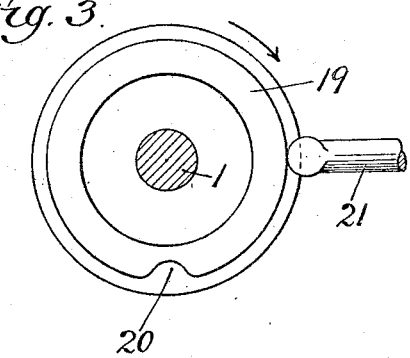
Fig. 3.
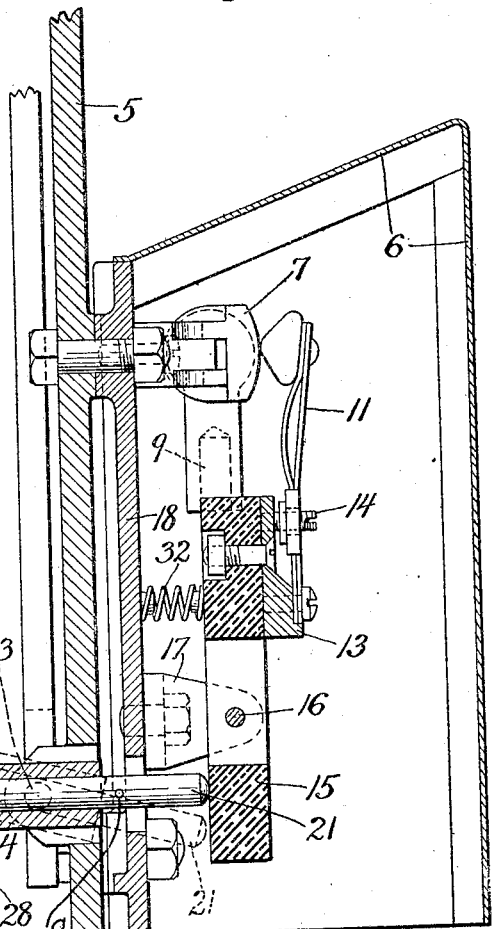
Fig. 2.
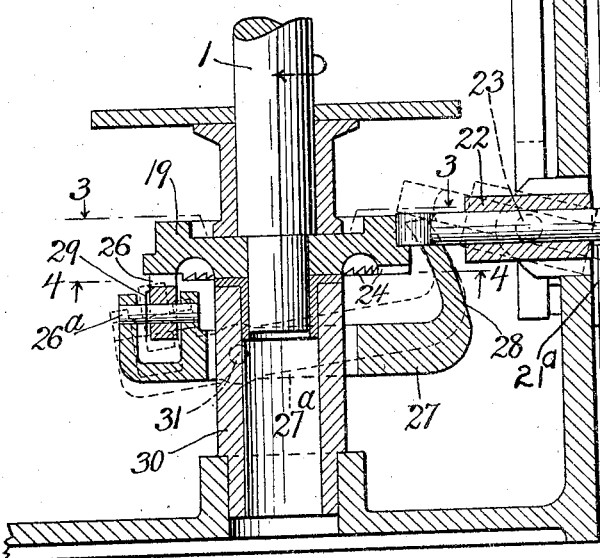
Witness.
Edward T. Wray
Inventor.
Thomas E. Pray
by Parker & Carter
Attorneys.

Patented Dec. 23, 1924.

1,520,137

UNITED STATES PATENT OFFICE.

THOMAS E. PRAY, OF CHICAGO, ILLINOIS, ASSIGNOR TO GOODMAN MANUFACTURING COMPANY, OF CHICAGO, ILLINOIS, A CORPORATION OF ILLINOIS.

CONTROLLER FOR ELECTRIC VEHICLES.

Application filed February 21, 1919. Serial No. 278,345.

*To all whom it may concern:*

Be it known that I, THOMAS E. PRAY, a citizen of the United States, residing at Chicago, in the county of Cook and State of Illinois, have invented a certain new and useful Improvement in Controllers for Electric Vehicles, of which the following is a specification.

This invention relates to controlling devices for electric vehicles and has for its object to provide a new and improved device of this description.

In the ordinary controller the circuit to the motor, that is the main circuit is broken by the controller contacts inside the controller casing and the present invention has as one of its objects to provide a controller where the motor or main circuit is broken outside of the controller casing.

Another object is to provide a construction for greatly increasing the capacity of the controller and for permitting one size of controller to be used with vehicles or locomotives of various sizes.

The invention has other objects which are pointed out in the description and claims thereof.

The invention is illustrated in the accompanying drawings, wherein—

Fig. 1 is a side view of a device embodying the invention with the auxiliary casing removed;

Fig. 2 is an enlarged sectional view with parts omitted, taken on lines 2—2 of Fig. 1;

Fig. 3 is a sectional view taken on the line 3—3 of Fig. 2;

Fig. 4 is a sectional view taken on the line 4—4 of Fig. 2;

Fig. 5 is an enlarged side view of the lower portion of the controller shaft.

Like numerals refer to like parts throughout the several figures.

Referring now to the drawings I have shown a controller for controlling the circuit to the electric motor of an electric vehicle such as an electric locomotive. The main portion of this controller may be of the usual type having a rotatable shaft 1 which when rotated varies the relation of a series of electric contacts 2 and a series of electric contacts 3 for controlling the circuit of the motor and the resistance therein. The shaft is rotated by a handle 4 and the shaft and contacts are mounted in a casing 5. The contacts in the casing 5 are the usual contacts used in the ordinary controller for cutting in and out the resistance in the motor circuit and which are controlled by rotating the shaft 1. Located outside of the casing 5 is an auxiliary casing 6 within which are located contacts for breaking the circuit to the motor. The number and size and arrangement of the contacts would depend upon the current controlled.

In the construction shown I provide two contacts 7 and 8 which may be stationary contacts and which are connected with the conductors 9 and 10 of the motor circuit. Associated with these contacts are the movable contacts 11 and 12 arranged so that when they are in contact with contacts 7 and 8 the circuit is completed and when they are out of contact therewith the circuit is broken. The contacts 11 and 12 are preferably spring contacts and are connected to the conductor 13 which completes the circuit between them. They are preferably provided with adjusting screws 14 for adjusting their position, and hence for adjusting the pressure they exert upon the contacts 7 and 8 when in their closed position, the contacts 11 and 12 may be moved in any desired manner. As herein shown they are connected through conductor 13 with the movable support 15 preferably of insulating material movably mounted in the auxiliary casing. In the particular construction illustrated this movable support is mounted on the rod 16 carried by the bracket 17, attached to the back 18 which is in turn attached to the casing 5.

I prefer to arrange the contacts 11 and 12 so that the circuit through the motor will always be automatically broken before the shaft 1 has been returned to its initial position. This may be done by providing a suitable operating connection between the shaft 1 and said contacts. As illustrated in the drawing the shaft 1 has connected therewith an actuating part or cam 19 which rotates with the shaft. This cam is provided at its periphery with a notch 20 to receive the end of a reciprocating part or rod 21, the reciprocating movement of which moves the support 15. The rod 21 also has a swivelling or lateral motion and this is secured by mounting it in a sleeve 22 which is pivoted at 23. The rod 21 is preferably provided with some suitable device such as the pin 21ᵃ for limiting its reciprocating movement in the sleeve 22 so as to prevent it from being accidentally pushed too far into the casing 5. The underside of the cam 19 is provided with a series of teeth 24 a portion of said cam 25 being free from teeth.

A pawl 26 is arranged to engage the teeth 24 and is pivotally connected at 26ᵃ with a lever 27 having an up turned end 28 adapted to engage the rod 21 under predetermined conditions. This lever is pivotally mounted in position in any desired manner.

As illustrated the lever is provided with an annulus 27ᵃ which surrounds the guide 30 of the shaft 1 and is pivoted with said guide by the pivots 31 (see Fig. 5). A spring 29 is provided for holding the pawl 26 normally in contact with the teeth 24. The conductor 10 leads to the contacts inside of the controller casing so that the proper circuit through these contacts may be made. The support 15 may be arranged so that when it is released from the rod 21 its weight will move it to separate contacts 11 and 12 from contacts 7 and 8 or a spring 32 may be provided for this purpose.

The use and operation of my invention are as follows:

When the shaft 1 is moved to start the motor it is moved in the direction of the arrow in Figs. 1 and 5. The first movement of the shaft and the cam 19 causes the end of the rod 21 to be moved out of the notch 20 of the cam thus pushing the rod forward so that it moves the lower end of the support 15 outwardly and the upper end inwardly so as to move the contacts 11 and 12 into contact with the contacts 7 and 8 to close the motor circuit. The end of the rod 21 now rides on the periphery of the cam, the rod being thus held so as to hold the contacts in their closed position. When the smooth or untoothed portion 25 of the cam 19 passes the pawl 26, the pawl then engages the teeth 24 and is moved about the pivot 26ᵃ as it passes from tooth to tooth.

This movement does not materially affect the lever 27 and the shaft 1 may be rotated to its maximum forward position without affecting said lever. If now it is desired to shut down the motor, rotation of the shaft 1 is reversed by moving the handle towards its initial position. As soon as this backward movement of the shaft and the cam 19 begins the pawl 26 does not slide over the teeth 24 because of their shape, but is engaged thereby so as to move about its pivot 26ᵃ. This movement pushes down the end of the lever 27 to which the pawl is connected and pushes up the end 28 which then engages the rod 21 and moves it upwardly so that it is disengaged from the periphery of the cam 19, the parts during this movement moving about the pivotal point 23 of the sleeve 22.

The support 15 is then moved out its pivotal point either by gravity, or the spring 32 and the contacts 11 and 12 are disengaged from the contacts 7 and 8, the end of the rod 21 being pushed backwardly along the top of the cam 19. The circuit is then broken through the motor.

It will be seen that the contacts will be moved to break the motor circuit by the reversed movement of the shaft 1 at any time after the untoothed portion 25 has passed the pawl 26 so that the teeth 24 engage said pawl so that the motor circuit is always broken outside of the controller casing 5, even if the shaft 1 is returned to its initial position before its final forward position has been reached. When the untoothed portion 25 of the cam 19 comes opposite the pawl 26 the pawl is freed from the teeth and then rights itself and the lever 27 is then moved by its weight so as to permit the rod 21 to again move into the notch 20 which under this condition is beneath it. The parts are then in their initial position as shown in Fig. 2, the motor circuit being broken, and are ready for another operation.

It will be seen that by means of this construction the motor circuit is always broken by contacts separate from the controller contacts and which are located outside of the controller casing 6. This construction permits large contacts to be used at the point where the circuit is broken, thus permitting smaller contacts to be used inside the controller casing. It will be noted that there are two devices as it were which act to control the switch outside of the casing, both acting on the rod 21. One of these devices consists of the cam 19. This acts always at a predetermined point when the rod is moved out of the notch 20 and acts to close the switch. The device for opening the switch acts not at a predetermined point but through a large range of movement and consists of the lever 27 and the pawl 26 and the shaft 24 and associated parts for it will be seen that whenever there is a backward movement of the shaft 1 at one point where the pawl 26 engages the teeth 24, the lever 27 is moved so that the end 28 moves up and moves the rod 21 out of engagement with the cam so as to cause the switch to open. In other words the switch outside of the casing is closed at a predetermined point where it is opened through a large range, thus insuring the opening of the motor circuit whenever the controller handle is reversed and as soon as the reversed movement begins. This greatly reduces the cost of the controller and permits it to be made smaller so as to occupy less space. This construction also permits one size of controller to be used with vehicles or locomotives of various sizes and greatly increases the capacity of any given controller as the condition which heretofore controlled the construction and size of the controller inside of the casing 5 is thus eliminated from the casing and made a separate part, wherein the contacts can be cheaply and easily made of sufficient size to meet the requirements. This mechanism also provides a safety device which prevents the operator from turning the controller handle backward to an intermediate position without first returning the handle of the controller to the zero point, thus compelling the operator to start from the beginning, and preventing the danger of drawing an arc and turning the controller contacts, which often happens with the ordinary type of controller when the operator maniuplates the controller by moving the handle intermediate the contact points. With the present construction this cannot be done and it is impossible to reduce the speed of the locomotive by means of the controller without returning the controller handle to the zero or initial position.

I claim:—

1. A controlling device for electric vehicles comprising a shaft, a series of contacts controlled by said shaft, a casing in which said contacts and shaft are mounted, a motor circuit, relatively movable contacts outside of said casing and connected in said motor circuit, a movable part which when moved causes a relative movement of said motor circuit contacts, an actuating part for said movable part which projects into said casing, a cam associated with said shaft so as to be rotated thereby the cam engaging said actuating part so as to move it to move the movable part to cause the motor contacts to be engaged, a lever adapted to engage said actuating part and move it to an inoperative position, so that the movable part may be moved to disengage said motor contacts, a pawl connected with said lever, teeth connected with a part rotated by said shaft and adapted to engage said pawl, said teeth when the shaft is moved in one direction moving the pawl so as to move the lever and cause it to move the engaging part to its inoperative position.

2. A controlling device for electric vehicles comprising a shaft, a series of contacts controlled by said shaft, a casing in which said contacts and shaft are mounted, a motor circuit, relatively movable contacts outside of said casing and connected in said motor circuit, a movable part which when moved causes a relative movement of said motor circuit contacts, an actuating part for said movable part which projects into said casing and adapted when moved in one direction to move the movable part to cause the motor circuit contacts to be engaged, one end of said actuating part projecting into said casing, a pivoted sleeve in which said actuating part slides, a cam rotated by said shaft and provided with a notch in which the end of said actuating part is received when the shaft is in a predetermined position, a pivoted lever, a connecting mechanism between said lever and said shaft so that when the shaft is rotated in one direction the lever is moved, said lever adapted to engage said actuating part when moved and move the actuating part to an inoperative position, and means for moving said motor contacts so as to separate them when said actuating part is in its inoperative position.

In testimony whereof, I affix my signature in the presence of two witnesses this 31st day of January, 1919.

THOMAS E. PRAY.

Witnesses:
MINNIE M. LINDENAU,
EDNA B. PETERSON.